(12) United States Patent
Saito et al.

(10) Patent No.: US 6,650,345 B1
(45) Date of Patent: Nov. 18, 2003

(54) OPERATING DEVICE FOR OPERATING VEHICLE ELECTRONICS DEVICE

(75) Inventors: Humio Saito, Iwaki (JP); Satoshi Kodama, Iwaki (JP); Syu Takahara, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/563,894

(22) Filed: May 2, 2000

(30) Foreign Application Priority Data

Jun. 11, 1999 (JP) .......................................... 11-165875

(51) Int. Cl.$^7$ ................................................ G06F 15/50
(52) U.S. Cl. ...................................... 345/764; 345/173
(58) Field of Search ................................. 345/173, 175, 345/174, 764, 741, 762, 765; 701/50

(56) References Cited

U.S. PATENT DOCUMENTS 5,539,429 A * 7/1996 Yano et al. .................. 345/173
5,907,319 A 5/1999 Hashimoto et al.
6,141,612 A * 10/2000 Flamme et al. ............... 701/50
6,232,961 B1 * 5/2001 Kunimatsu .................. 345/173

* cited by examiner

*Primary Examiner*—Cao (Kevin) Nguyen
(74) *Attorney, Agent, or Firm*—Brinks Hofer Gilson & Lione

(57) ABSTRACT

An operating device for operating at least one vehicle electronic device includes an image display device connected to the vehicle electronic device, a controller including an input device for operating the electronic device, and a sensor for detecting one of a touch and an approach of a user at the input device. When the sensor detects one of the touch and the approach of the user at the input device, the image display device displays a predetermined image concerning the input device on a display screen.

20 Claims, 4 Drawing Sheets

OPERATING DEVICE FOR OPERATING VEHICLE ELECTRONICS DEVICE

BACKGROUND OF THE INVENTION

1. Field of the Invention

The present invention relates to operating devices for operating complex vehicle electronic devices, and more particularly relates to an operating device for operating at least one vehicle electronic device using a single controller.

2. Description of the Related Art

Recently, various electronic devices, such as audio devices including FM/AM receivers and CD players, communication devices including cellular phones, navigation systems, and televisions, have been mounted in vehicles. Sensors for detecting the states of these electronic devices, the states of automotive air conditioners, and the states (such as a temperature and a velocity) of the vehicle are interconnected through wires (such as a wire harness and optical fibers). With this construction, a single controller can perform integrated control of the electronic devices, and a single image display device can perform integrated display of the states of the electronic devices and the states of the vehicle.

Due to an increase in the number of vehicle electronic devices and multiple functionality of the electronic devices, operation of the electronic devices tends to become more complicated. Since the vehicle's electronic devices may be operated while the vehicle is running, a driver must determine intuitively an appropriate operation. The image display device is required to display an image with high visibility that enables the driver to quickly recognize the necessary information.

BRIEF SUMMARY OF THE INVENTION

Accordingly, it is an object of the present invention to provide an operating device for vehicle electronic devices, which provides an image with high visibility enabling a driver to determine intuitively an appropriate operation and to operate complicated functions of the electronic devices in a simple manner.

According to the present invention, there is provided an operating device for operating at least one vehicle electronic device including an image display device connected to the vehicle electronic device, a controller with an input device for operating the electronic device, and a sensor for detecting the touch or approach of a user at the input device. When the sensor detects the touch or approach of the user at the input device, the image display device displays an image of the input device and the functions allocated to the input device.

In the present invention, when a hand of the user touches or approaches the input device, the sensor outputs a predetermined signal. The image display device displays the image of the input device and the functions allocated to the input device in accordance with the predetermined signal from the input device.

In the present invention, since the image display device displays the image of the input device and the functions allocated to the input device at that time, the user can confirm which operation invokes which function at a glance. Thus, the user can easily operate electronic devices even in a vehicle electronic device system in which the electronic devices are interconnected through a bus line. In the present invention, the image display device displays the image of the input device and the functions allocated to the input device only when the hand of the user or the like touches or approaches the input device. The image display device does not display the image of the input device and the functions allocated to the input device when the hand of the user does not touch or approach the input device. Therefore, the image display device has a simplified display screen and improved visibility.

For further simplification of the display screen when the user does not operate the electronic devices, it is preferable to provide an optical shutter, such as a liquid crystal shutter, in front of the image display device to hide unnecessary portions while leaving exposed the necessary portions. Although the optical shutter may not be used and the unnecessary portions may be simply displayed as a black screen, a liquid crystal display panel, which is generally used as a vehicle image display device, may leak light in the diagonal direction due to viewing angle characteristics. For preventing the leakage of light, it is preferable to provide the optical shutter in front of the image display device and to block the light by means of the optical shutter, as described above.

DETAILED DESCRIPTION OF THE INVENTION

The present invention is described through preferred embodiments with reference to the accompanying drawings.

Figure 1:
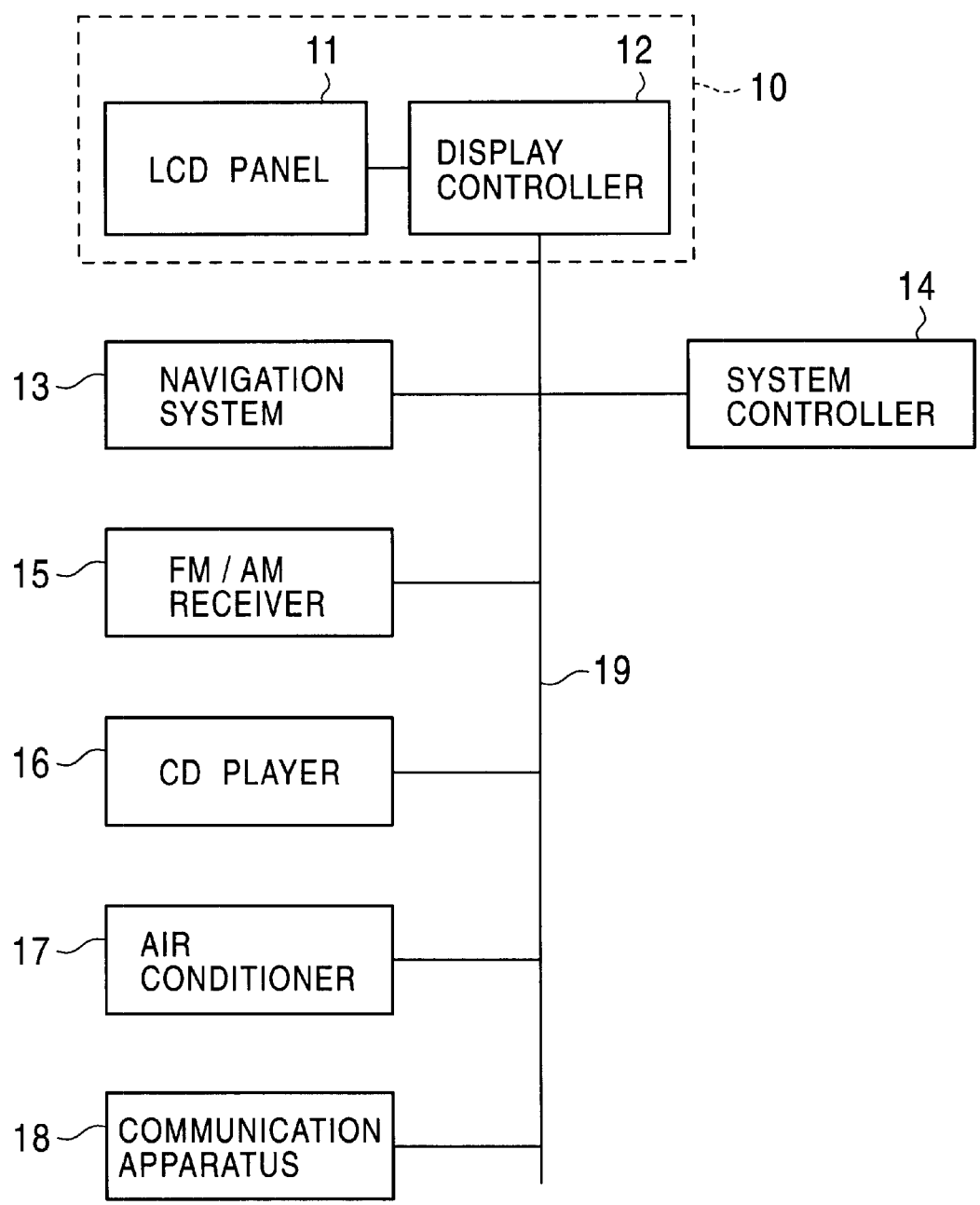
FIG. 1 is a block diagram of a vehicle electronic device system according to a first embodiment of the present invention.

FIG. 1 is a block diagram of a vehicle electronic device system according to a first embodiment of the present invention.

Referring to FIG. 1, the vehicle electronic device system includes an image display device 10. The image display device 10 includes a liquid crystal display (LCD) panel 11 and a display controller 12 for generating an image to be displayed on the LCD panel 11 based on a signal from each electronic device described hereinafter. The vehicle electronic device system further includes a navigation system 13, a system controller 14, an FM/AM receiver 15, a CD player 16, an air conditioner 17, and a communication apparatus 18, such as a car phone, for external communication.

The display controller 12, the navigation system 13, the system controller 14, the FM/AM receiver 15, the CD player 16, the air conditioner 17, the communication apparatus 18, and the like are interconnected through a bus line 19 formed of a wire harness or an optical fiber. These electronic devices can transmit signals to and receive signals from each other through the bus line 19.

The navigation system 13 detects the present position of the vehicle by means of a global positioning system (GPS), and reads map data for the area surrounding the vehicle from a storage unit, e.g., a digital versatile disk (DVD). The LCD panel 11 of the image display device 10 displays a map image for the area surrounding the vehicle. The navigation system 13 searches for an optimal guidance route to a destination, and properly outputs guidance information so that the vehicle follows the guidance route. Traffic information received through, for example, the FM/AM receiver 15 and the communication apparatus 18 is input to the navigation system 13. The navigation system 13 displays the locations of impassable roads, due to traffic accidents, traffic control, and the like, on the map image, and searches again for a guidance route avoiding the obstructed roads.

The FM/AM receiver 15 can simultaneously receive broadcasts from two broadcasting stations. The FM/AM receiver 15 receives audio broadcasts from one broadcasting station while receiving data including traffic information from another broadcasting station. The FM/AM receiver 15 can transmit the received data to other electronic devices through the bus line 19.

The CD player 16, the air conditioner 17, and the communication apparatus 18 can change the operating states thereof and transmit signals indicating the present operating states to other electronic devices through the bus line 19.

Figure 2A:
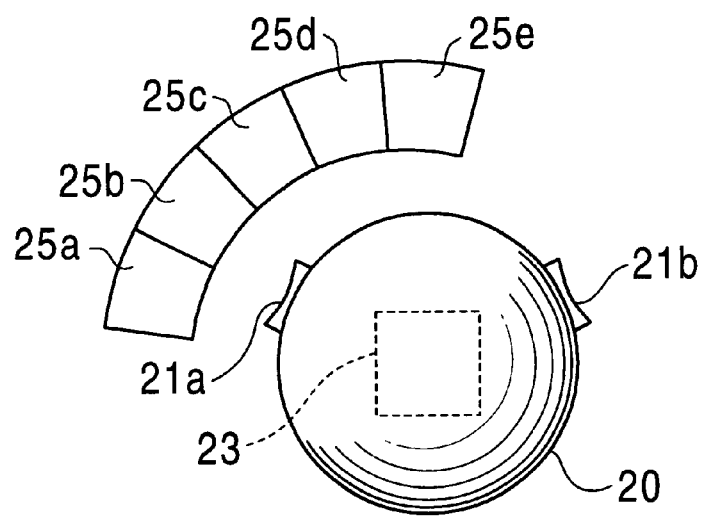
FIG. 2A is a schematic diagram of a system controller.
Figure 2B:
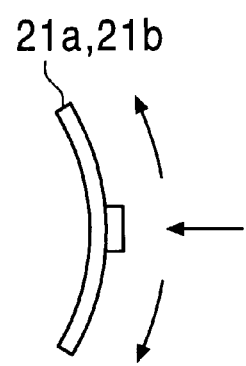
FIG. 2B is a schematic diagram of a three-directional switch.

FIG. 2A is a schematic diagram of the system controller 14. The system controller 14 includes an operating device (input unit) 20 for outputting a respective signal in accordance with eight-directional movement of a hemispherical head portion of the operating unit 20. The eight-directional movement includes back and forth movement, side to side movement, and diagonal movement. A passenger-seat three-directional switch 21a, a driver-seat three-directional switch 21b, and a touch sensor 23 are provided on both sides of the operating unit 20. Moving portions of the three-directional switches 21a and 21b are movable in three directions, i.e., the clockwise direction, the counterclockwise direction, and the direction toward the center of rotation, as indicated by arrows in FIG. 2B. When the moving portions of the three-directional switches 21a and 21b are moved clockwise, counterclockwise, or in the direction toward the center of rotation, respective signals are output from the three-directional switches 21a and 21b. When a user touches the operating unit 20, the touch sensor 23 outputs a predetermined signal. Alternatively, an approach sensor, instead of the touch sensor 23, may be employed for outputting a signal when a body, such as a hand, of the user approaches, within a predetermined distance, the operating unit 20.

Function keys 25a to 25e are provided in the vicinity of the operating unit 20. For example, when the function key 25a is pressed, the FM/AM receiver 15 becomes operable. When the function key 25b is pressed, the CD player 16 becomes operable. A function is allocated to each of the function keys 25a to 25e.

In the embodiment of the present invention, when a certain function is selected, the LCD panel 11 of the image display device 10 displays an image corresponding to the selected function. When the user touches the operating unit 20, the LCD panel 11 of the image display device 10 displays an image of the operating unit 20 and a function allocated to the operating unit 20 at that point based on the signal from the touch sensor 23.

Figure 3:
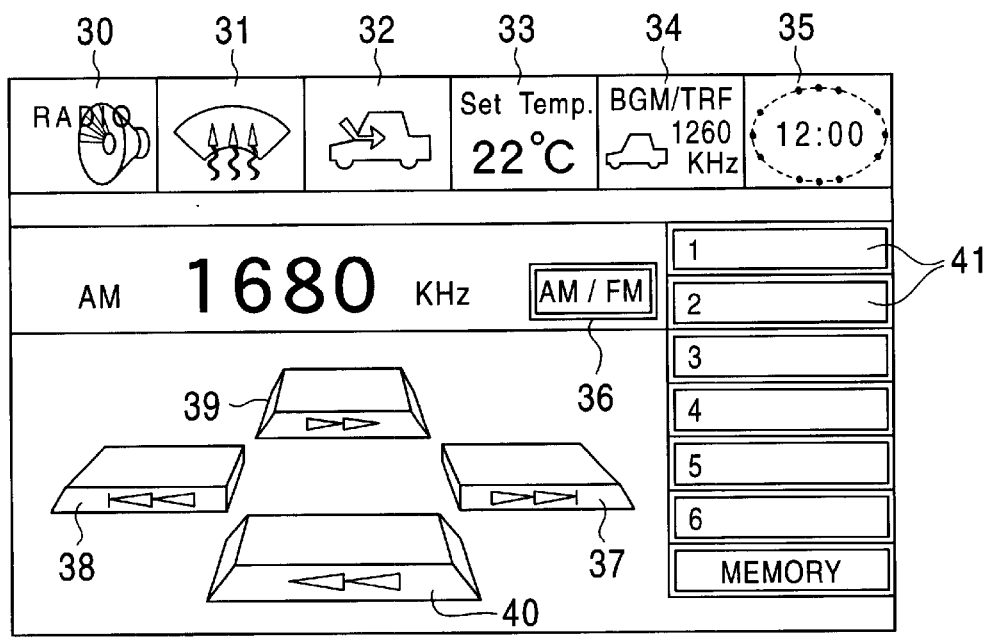
FIG. 3 is an illustration of a display screen during reception of a radio broadcast.

For example, when the FM/AM receiver 15 is receiving radio broadcasts, the LCD panel 11 displays a display screen as shown in FIG. 3. In FIG. 3, an icon 30 displayed at the upper left end indicates the electronic device operable by the system controller 14 at that time. In this embodiment, it is indicated that the FM/AM receiver 15 is operable by the system controller 14. Remaining icons 31 to 35 shown at the top respectively represent the state of a defroster, the state of a ventilator, the preset temperature of the air conditioner, a secondary reception frequency of the FM/AM receiver 15, and the present time. Under the portion (hereinafter referred to as an "icon display portion") where the icons 30 to 35 are displayed, a frequency of a broadcasting station currently being received by the FM/AM receiver 15, an AM/FM switch button 36, a seek-up button 37, seek-down button 38, a manual-up button 39, and a manual-down button 40 are displayed. The buttons 37 to 40 are displayed in three dimensions. Preset buttons 41 are shown at the right side of the screen.

When the user touches the operating unit 20 under this condition, a predetermined signal is output from the touch sensor 23. In response to the output signal, the LCD panel 11 displays a mark 42 (shown in broken lines in FIG. 4, and hereinafter referred to as an "operating-unit mark") representing the operating unit 20 in three dimensions. The LCD panel 11 also displays triangular marks 43 (shown in broken lines in FIG. 4, and hereinafter referred to as "triangular marks") in three dimensions on the front (back side), the back (front side), the right side, and the left side of the operating-unit mark 42. The triangular marks 43 indicate forward movement, backward movement, rightward movement, and leftward movement, respectively, of the operating unit 20. For example, when the operating unit 20 is moved forward or backward, the button 39 or 40 on the screen is displayed as if it is pressed, and the reception frequency of the FM/AM receiver 15 is moved up or down step by step. When the operating unit 20 is moved to the right or to the left, the button 37 or 38 is displayed as if it is pressed, and the reception frequency of the FM/AM receiver 15 is continuously moved up or down (seek up or seek down).

When the moving portion of the three-directional button 21a (or the three-directional button 21b) on the side of the operating unit 20 is moved clockwise or counterclockwise with fingers, the preset buttons 41 at the right side of the screen are selected one by one, causing the selected button to change color. When a desired one of the preset buttons 41 is selected (when the color of the selected button is changed), and the three-directional button 21a (or the three-directional button 21b) of the operating unit 20 is pressed and held (pressed for a predetermined period of time), the reception frequency is changed to the frequency of the broadcasting station preset for the selected button 41.

When the three-directional button 21a (or the three-directional button 21b) of the operating unit 20 is momentarily pressed and released, the reception frequency of the FM/AM receiver 15 is changed from AM to FM (or FM to AM).

Accordingly, the operating unit 20 of the system controller 14 is operated to operate the FM/AM receiver 15 and other electronic devices.

In this embodiment, when the user touches the operating unit 20 of the system controller 14, the LCD panel 11 of the image display device 10 displays the operating-unit mark 42, the buttons 37 to 40 indicating functions allocated at that time to the operating unit 20, and the triangular marks 43.

Without looking at the actual operating unit 20, the user can determine intuitively an appropriate operation by just looking at the image displayed on the LCD panel 11.

In this embodiment, the operating-unit mark 42 and the triangular marks 43 are displayed only when the user touches the operating unit 20. When the user releases his or her hand from the operating unit 20, the marks 42 and 43 are not displayed any more. Accordingly, the additional images of the operating-unit mark 42 and the triangular marks 43 are not displayed when the user does not operate the system controller 14, thus simplifying the display screen and improving visibility.

In this embodiment, the front side, the back side, the right side, and the left side of the operating-unit mark 42 displayed on the screen correspond to the front side, the back side, the right side, and the left side of the actual operating unit 20. This enables the user to determine intuitively the operation of the operating unit 20 without looking at the actual operating unit 20. Accordingly, the present invention substantially improves operability of the vehicle electronic devices connected to the bus line.

Hereinafter, a vehicle electronic device system according to a second embodiment of the invention is described with reference to FIGS. 4 to 6.

The vehicle electronic device system of the second embodiment has the same form and functions as those of the first embodiment. In addition, the vehicle electronic device system of the present embodiment hides unnecessary portions of a display screen of the LCD panel 11 when a user does not touch the operating unit 20.

Figure 5A:
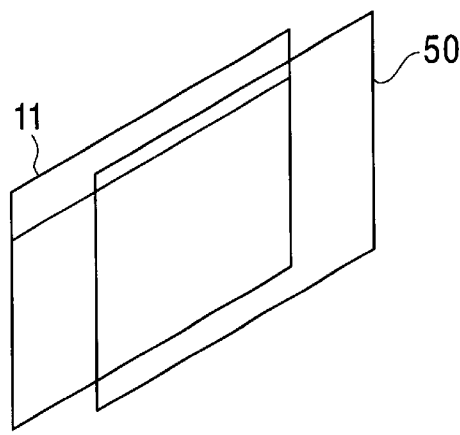
FIG. 5A and FIG. 5B are schematic diagrams of a vehicle electronic device system according to a second embodiment of the present invention.
Figure 5B:
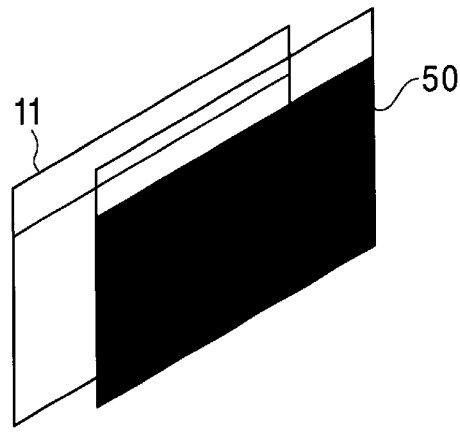
Figure 6:
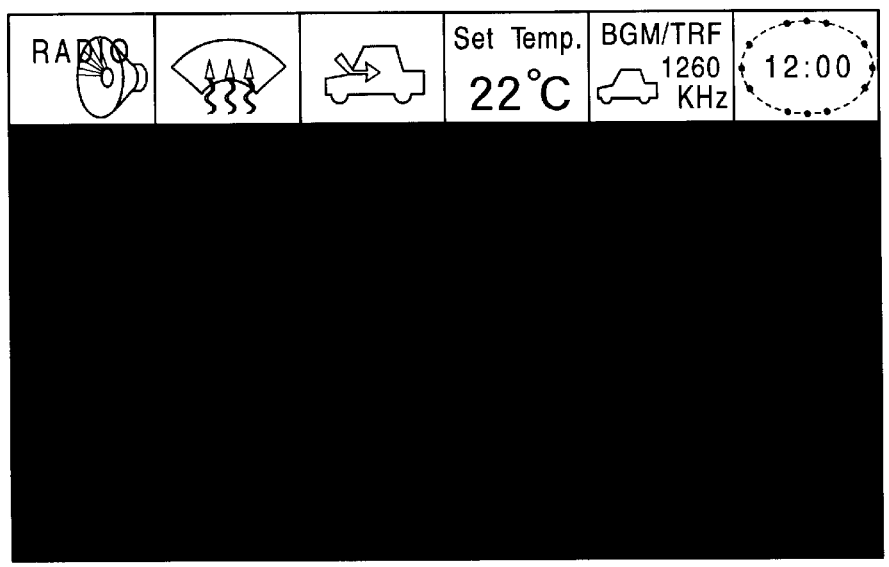
FIG. 6 is an illustration of an example of the display screen partially hidden by a liquid crystal shutter of the second embodiment.

Specifically, in this embodiment, as shown in FIG. 5A, a liquid crystal shutter 50 is provided in front of the LCD panel 11. When the user does not touch the operating unit 20, the liquid crystal shutter 50 is activated by a signal from the touch sensor 23, hiding portions except for the top portion (icon display portion), as shown in FIG. 5B.

Figure 4:
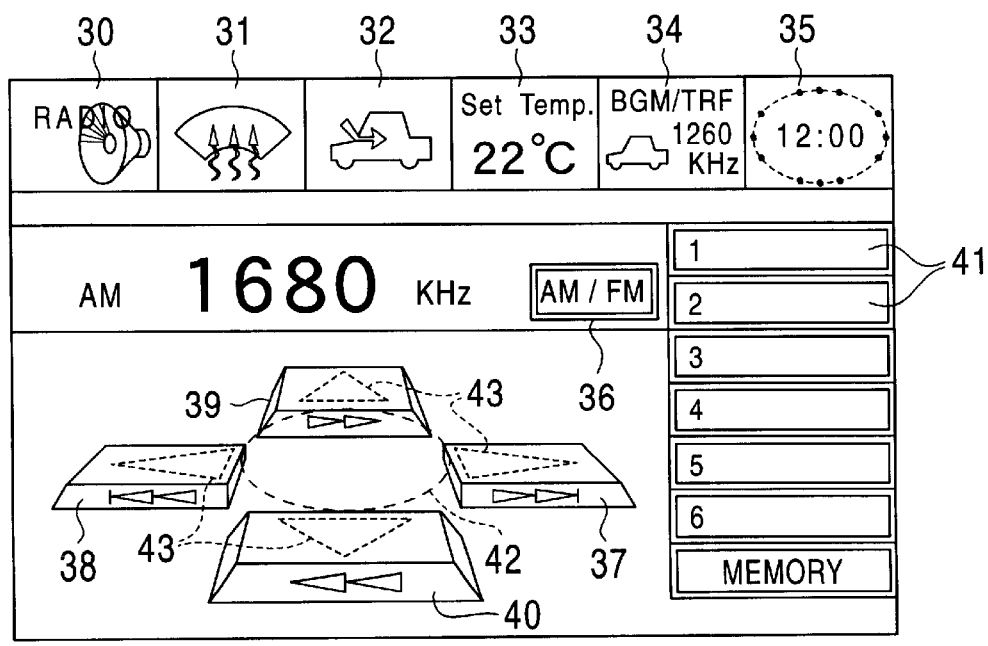
FIG. 4 is an illustration of an example of the display screen when a user touches an operating device of the system controller.

For example, when the user wants to change the reception frequency of an FM/AM receiver 15, the LCD panel 11 displays the screen shown in FIG. 4. Subsequently, when the user releases his or her hand from the operating unit 20, and after a predetermined period of time (a few seconds) has passed, the liquid crystal shutter 50 is activated and hides portions of the screen leaving the icon display portion at the top, as shown in FIG. 6. Therefore, unnecessary information is not displayed, thus simplifying the display of the LCD panel 11 and improving visibility.

Instead of using a liquid crystal shutter, portions except for the icon display portion may be displayed as a black screen. In LCD panels, viewing characteristics are good in the vertical direction with respect to the screen. However, the contrast is low when the LCD panel is seen from the diagonal direction. In an extreme case, the bright and dark areas may be inverted. If the portions except for the icon display portion are simply displayed as a black screen, the screen may not be black when seen from the diagonal direction, and light may leak. To this end, in the present embodiment, the liquid crystal shutter 50 is used to hide unnecessary portions (portions other than the icon display portion) so as to display the unnecessary portions as a black screen in a more complete manner.

What is claimed is:

1. An operating device for operating at least one vehicle electronic device, said operating device comprising:
   an image display device operatively connected to said at least one vehicle electronic device and including a display screen;
   a controller including a manually operable input device for operating said at least one electronic device, said input device being physically distinct from said image display device; and
   a sensor for detecting one of a touch and an approach of a user at the input device;
   wherein, when said sensor detects one of the touch and the approach of the user at the input device, said image display device displays a predetermined image relating to the input device on said display screen.

2. An operating device for operating at least one vehicle electronic device according to claim 1, wherein the predetermined image includes at least an image of the input device.

3. An operating device for operating at least one vehicle electronic device according to claim 1, wherein a display image representing an operable electronic device is provided on the display screen.

4. An operating device for operating at least one vehicle electronic device according to claim 3, wherein a display image representing at least a preset temperature of an air conditioner in addition to the operable electronic device is provided.

5. An operating device for operating at least one vehicle electronic device according to claim 1, wherein, when a predetermined function is selected while said sensor detects one of the touch and the approach of the user, a display screen in accordance with the selected function is displayed.

6. An operating device for operating at least one vehicle electronic device according to claim 1, wherein, when said sensor does not detect the touch and the approach of the user at the input device, said image display device does not display the image of the input device and functions allocated to the input device on the display screen.

7. An operating device for operating at least one vehicle electronic device according to claim 1, wherein said image display device and said controller are connected through a bus line to said at least one vehicle electronic device.

8. An operating device for operating at least one vehicle electronic device according to claim 1, further comprising an optical shutter mounted on said image display device, said optical shutter partially hiding the image displayed on said image display device in accordance with a predetermined signal.

9. An operating device for operating at least one vehicle electronic device, said operating device comprising:
   an image display device operatively connected to said at least one vehicle electronic device and including a display screen;
   a controller including an input device for operating said at least one vehicle electronic device, said input device being separate from said image display device; and
   a sensor for detecting one of a touch and an approach of a user at the input device;
   wherein, when said sensor detects one of the touch and the approach of the user at the input device, said image display device displays an image of the input device and functions allocated to the input device on said display screen.

10. An operating device for operating at least one vehicle electronic device according to claim 9, wherein a display image representing an operable electronic device is provided on the display screen.

11. An operating device for operating at least one vehicle electronic device according to claim 9, wherein, when said sensor does not detect the touch and the approach of the user at the input device, said image display device does not display the image of the input device and the functions allocated to the input device on the display screen.

12. An operating device for operating at least one vehicle electronic device according to claim 9, further comprising an optical shutter mounted on said image display device, said optical shutter partially hiding the image displayed on said image display device in accordance with a predetermined signal.

13. A vehicle electronic device system comprising:
   a system controller including an input device having a sensor for detecting one of a touch and an approach of a user;
   an image display device including a display screen for displaying, when said sensor detects one of the touch and the approach of the user at the input device, a predetermined image relating to the input device on said display screen; and
   a vehicle electronic device connected through a bus line to said image display device and said controller, said vehicle electronic device including at least an audio device; wherein said input device and said image display device are positioned at different locations in the vehicle.

14. A vehicle electronic device system according to claim 13, wherein said image display device includes a liquid crystal panel and a display controller for generating an image to be displayed on the liquid crystal panel.

15. A vehicle electronic device system according to claim 13, wherein the predetermined image includes at least an image of the input device.

16. A vehicle electronic device system according to claim 13, wherein a display image representing an operable electronic device is provided on the display screen.

17. A vehicle electronic device system according to claim 16, wherein a display image representing at least a preset temperature of an air conditioner in addition to the operable electronic device is provided.

18. A vehicle electronic device system according to claim 13, wherein, when a predetermined function is selected while said sensor detects one of the touch and the approach of the user, a display screen in accordance with the selected function is displayed.

19. A vehicle electronic device system according to claim 13, wherein, when said sensor does not detect the touch and the approach of the user at the input device, said image display device does not display the image of the input device and functions allocated to the input device on the display screen.

20. A vehicle electronic device system according to claim 19, further comprising an optical shutter mounted on said image display device, said optical shutter partially hiding the image displayed on said image display device in accordance with a predetermined signal.

* * * * *